C. R. GABRIEL.
METHOD OF PRODUCING FLAT SURFACES ON THE EDGES OF STAMPINGS AND DRAWN SHELLS.
APPLICATION FILED OCT. 21, 1916.

1,265,901.

Patented May 14, 1918.
6 SHEETS—SHEET 1.

Fig. 1.

WITNESSES:

INVENTOR:
Charles R. Gabriel
By Attorneys,

C. R. GABRIEL.
METHOD OF PRODUCING FLAT SURFACES ON THE EDGES OF STAMPINGS AND DRAWN SHELLS.
APPLICATION FILED OCT. 21, 1916.

1,265,901.

Patented May 14, 1918.
6 SHEETS—SHEET 2.

WITNESSES:
René Bruine
Burks F Vaughan

INVENTOR
Charles R. Gabriel
By Attorneys,
Fraser, Fink & Myo

C. R. GABRIEL.
METHOD OF PRODUCING FLAT SURFACES ON THE EDGES OF STAMPINGS AND DRAWN SHELLS.
APPLICATION FILED OCT. 21, 1916.

1,265,901.	Patented May 14, 1918.
6 SHEETS—SHEET 3.

C. R. GABRIEL.
METHOD OF PRODUCING FLAT SURFACES ON THE EDGES OF STAMPINGS AND DRAWN SHELLS.
APPLICATION FILED OCT. 21, 1916.

1,265,901.

Patented May 14, 1918.

UNITED STATES PATENT OFFICE.

CHARLES R. GABRIEL, OF BROOKLYN, NEW YORK.

METHOD OF PRODUCING FLAT SURFACES ON THE EDGES OF STAMPINGS AND DRAWN SHELLS.

1,265,901. Specification of Letters Patent. Patented May 14, 1918.

Original application filed April 24, 1914, Serial No. 834,105. Divided and this application filed October 21, 1916. Serial No. 126,991.

*To all whom it may concern:*

Be it known that I, CHARLES R. GABRIEL, a citizen of the United States of America, residing in the borough of Brooklyn, county of Kings, city and State of New York, have invented certain new and useful Improvements in Methods of Producing Flat Surfaces on the Edges of Stampings and Drawn Shells, of which the following is a specification.

My invention relates to a method of trimming the flash or scrap from stampings or drawn shells, and is particularly adapted to articles wherein the line of juncture between the said flash or scrap and the stamped or drawn body is in a single plane, so that a flat surface is produced on the edge of the stamping or drawn shell when the flash or scrap is trimmed. The present application is a division of an earlier application filed by me April 24, 1914, Serial No. 834,105 (since patented, No. 1,235,197, issued July 31, 1917).

My invention will be found particularly useful in trimming the edges of shells or stampings which are intended to be united, as for instance, two stampings which, united, will form a knife handle, or any other piece of hollow ware or similar object. In such cases the production of flat edges hitherto has been a laborious, expensive and wasteful operation, particularly in cases where precious metals were employed, and a lack of desired uniformity in the stampings frequently occurs. An important object of my invention, therefore, and a great advantage attained by the use thereof, is in the fact that I am enabled rapidly, and without waste of material, to produce shells which have their surfaces absolutely flat and in perfect condition for uniting, as by soldering or welding, without further treatment, and which, when so united, will form a perfect joint.

My invention has for its object to produce an edge to the said flat surface which is suitable for soldering or finishing without further grinding or filing, and which shall present the full thickness of the material employed. Another object of my invention and an advantage accomplished by the use thereof, is to insure that the stamping shall be trimmed in one plane which may be on the forming die line if desired or at any desired point below the same, so that the said stamping will in all respects have the exact depth required. Another object of my invention and an advantage flowing therefrom, is that the flash or scrap is cut clean without slivers, and without the production of any grinding or filing dust, thereby saving the considerable loss which follows where grinding or filing is necessary in connection with the employment of the expensive materials frequently used by jewelers and silversmiths in the manufacture of their wares. In cases where dies are used in the practice of my invention, an advantage will be attained thereby in the prolongation of the life of the dies employed, and a further advantage follows from the fact that by the aid of my invention objectionable distortion of the dies is prevented by reason of the fact that the holding die usually need not be hardened, and the cutting die although usually required to be hardened has an outline only approximately the shape of the inside of the stamping, and therefore its distortion is negligible.

My invention consists in a method of trimming the flash or scrap from the edge of a stamping or drawn shell wherein the stamping or drawn shell is supported in a female die, and the flash or scrap is severed by cuts from a cutting die in conjunction with said female die, which cuts are directed outwardly with respect to the stamping and in the plane of the surface which will be produced upon the edge of such stamping or shell after the scrap or flash is severed.

In the practice of my said method I prefer to employ a pair of dies, to wit, a holding or female die wherein the stamping or drawn shell which is to be trimmed on its edge shall be held in such manner that the said stamping or drawn shell is supported on the outside immediately below the surface to be trimmed, and likewise a cutting die which is located with its cutting edge within the outline of the surface which will be produced upon the edge of such stamping or shell after the flash or scrap is severed, and in the plane of such surface.

In the practical employment of my said invention I prefer to use automatic devices whereby the two dies referred to shall be given relative movement in the plane of the surface to be trimmed, whereby the flash or scrap is trimmed from the stamping or drawn shell, and the desired flat surface is produced in a single plane.

Desirable automatic devices by the aid of which my invention may be employed are illustrated in the accompanying drawings, wherein—

According to my invention a stamping or drawn shell is trimmed evenly, producing a flat surface which is substantially the thickness in cross-section of the material employed. In operating the method to accomplish this result, the stamping or drawn shell to be trimmed is firmly held by suitable means, for which purpose I prefer to employ a female die, and in such die the stamping is supported on the outside at points immediately below the plane of the surface which will be produced by the trimming of the flash or scrap. The next step in the method consists in directing shearing cuts against this flash or scrap, and these cuts extend in an outward direction, i. e., in a direction extending from a point or points within the outline of the surface to be trimmed, to a point or points outside of such surface.

In the commercial use of my invention I prefer to employ assembled machines, but the invention is not limited thereto, nor is any particular construction of machine essential to its employment.

I have illustrated in the accompanying drawings automatic machinery by the aid of which my invention may be employed, and this is the best manner of carrying my invention into effect now known to me.

In the apparatus illustrated, the stamping or drawn shell which is to be trimmed is preferably supported in a lower or holding die B, which for this purpose is provided with an opening $b$ which is the shape of the stamping at the point to be trimmed. Into this opening the stamping which has been produced in the forming die is placed, and the flash will thereupon extend above the top of the holding die B. The said stamping A being properly placed in the holding die B, the upper or cutting die C is brought down to operative position, in which position its lower face is level with the top of the holding die B. The cutting die preferably has a contour somewhat irregularly conforming to the outline of the surface to be trimmed, but of slightly smaller size. When this cutting die is in operative position it is within the outline of the surface to be trimmed. This outline will frequently be of elliptical, oblong or circular shape wherein the surface to be trimmed extends on opposite sides of the stamping, but my invention is not necessarily limited in its application to a stamping of this character. The next step in the method wherein the flash or scrap is trimmed from the edge of the stamping or drawn shell so held and the desirable flat surface is produced, is accomplished by giving relative movement to the holding and cutting dies sufficient to cause the cutting die to pass over every part of the surface to be trimmed in a direction extending from the inside to the outside of the stamping. This result may be produced by a movement of the holding die or by a movement of the cutting die. For several reasons I believe the best results to be accomplished are by a construction wherein the holding die is the movable element of the combination, but I do not desire to be understood as limiting myself to this element as the movable one.

The movement which is imparted to the movable member of the said two dies is one whereby the cutting die will be caused to approach each part of the surface that requires trimming, and to pass over the same so as to effectually trim or shear off the flash or scrap. This result may be accomplished by providing the movable member with a number of movements along straight lines that are at an angle with relation to one another, and it will then be seen that four of such movements directed respectively toward the different parts of the surfaces of the stamping to be trimmed will effectually trim all parts of the said surface, but the surface may likewise be effectually trimmed by a rotary, oblong, oval or elliptical movement, whereby the cutting die is caused to effectually traverse all parts of the surface to be trimmed. Both of these movements are illustrated in the drawings herewith presented, the preferred form of apparatus illustrating movements on straight lines that are perpendicular to each other, and the modified form illustrating a substantially rotary relative movement of the cutting members.

The holding die B by reason of having the opening $b$ substantially conform to the shape of the stamping to be trimmed, provides that the said stamping shall be supported at the outer edge of the said surface to be trimmed, and in a position so that the material is supported opposite the side from which the cutting die enters. The holding die may well be formed in several pieces. A separate block or supporting pad $b^{10}$ may be inserted in the opening $b$ and may be perforated at $b^2$ for the reception of a die stripper, although this may not be required. The stamping is pressed against the upper surface $b^{11}$ of such pad which is the shape of the stamping. The pad is held in position by a clip $b^3$. The separate part $b^4$ of the lower or holding die is the part which furnishes the support for the stamping at the trimming point, and therefore may be of some harder material than the center part $b^{10}$. It is held in position by any suitable means, as for instance by screws $b^5$, which are threaded into the die block Y.

The upper or cutting die C is preferably reciprocated by means hereinafter described, for the purpose of enabling the work to be inserted. I prefer to provide the apparatus with a presser foot or feet to press upon the said flash or scrap to level the stamping in the holding die so that it may be accurately trimmed, and uniformity of trimming in successive stampings may be obtained.

Figure 5:
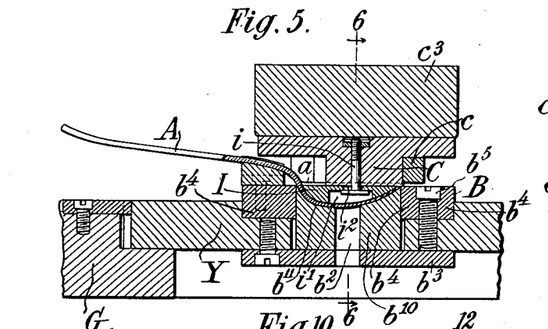
Fig. 5 is a detail longitudinal sectional view of the two dies in position, the holding die having just made its third movement toward the front of the machine, causing the upper or cutting die to shear or trim that part of the flat surface situated toward the rear of the machine.
Figure 6:
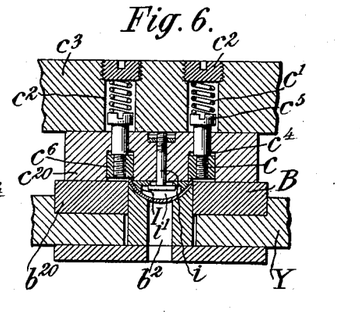
Fig. 6 is a cross-section of the parts illustrated in Fig. 5 taken on the line 6—6 of Fig. 5.

This is particularly useful when the stamping or shell to be trimmed has a shape such as the oval or spherical shape of the spoon bowl illustrated in Figs. 5 and 6 which is substantially in the arc of a circle and is liable to easily move in the holding die. In such case the action of the presser foot, or of each of the presser feet, is to level the blank before the pressure of the filler-piece acts to retard the free movement of the stamping, and insures uniform trimming. As illustrated, a plurality of presser feet $c$ are pressed against the work by springs $c^1$ which are situated in recesses $c^2$ in the support $c^3$ of the die C. Each presser foot is illustrated as sliding in a recess $c^4$ in the die C. A head $c^5$ and a threaded nut $c^6$ on the presser foot limit its movement.

Figure 16:
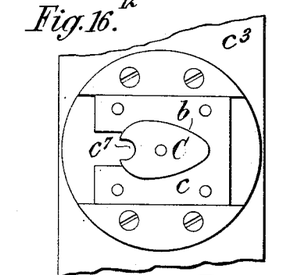
Fig. 16 is a bottom view of the top or cutting die of Figs. 5 and 6.

The cutting die C for the particular stamping of Fig. 5 is recessed at $c^7$ (Fig. 16) to prevent severing of the handle of the spoon during the cutting action of the dies.

The operation of my method is assisted by a filler I for the stamping which is for the purpose of clamping the stamping in position against the supporting pad in the holding die and holding the same from rolling in the die during trimming. The lower face of this filler substantially conforms to the interior shape of the stamping. Its upper face is level with the upper face of the holding die and provides a surface upon which the cutting die comes to rest. It is preferably attached to the cutting die so as to move therewith, and for this purpose it is supported by a headed stem $i$ which is threaded into the cutting die. The supporting head of the said stem is received in a recess $i^1$ in the said filler, and the body of the stem $i$ passes through a slot $i^2$ in said filler, whereby a play for the stem $i$ is provided which enables the filler I to partake of the relative movement between the two dies.

Figure 19:
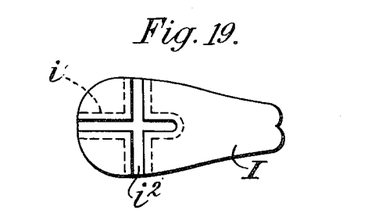
Fig. 19 is a top view of a filler illustrating slots therein by which it partakes of the relative movement of the dies.

The slot in the filler through which the stem passes may be varied as desired and according to the relative movement of the dies. For the movement of the preferred form a cross-shaped slot may be employed as illustrated in Fig. 19.

I have shown the filler I as being supported by the cutting die so that it may float, and I believe this to be a very advantageous construction, but these parts and their arrangement do not form part of my present invention. It will be apparent that the filling piece will perform its function effectively if otherwise inserted in the stamping, as, for instance, if used separately and inserted by hand. This latter method enables the operator, by employing several filling pieces, to have a stamping loaded with a filling piece ready for insertion in the holding die, as soon as the previous stamping which has been trimmed is removed.

The holding die B has lateral extension $b^{20}$, the upper surfaces of which are all in the same plane as the edges of the holding die which support the stamping adjacent the surfaces to be trimmed. The cutting die C is also provided with extensions $c^{20}$, the faces of which are carefully ground to the plane of the face of the cutting die, and these extensions in coöperation with the extensions $b^{20}$ of the holding die insure the proper relation between the cutting and holding dies and shroud the edges of the said dies so that they are protected from injury, incidental to the cutting die being improperly adjusted in its relation to the surface of the holding die.

Figure 7:
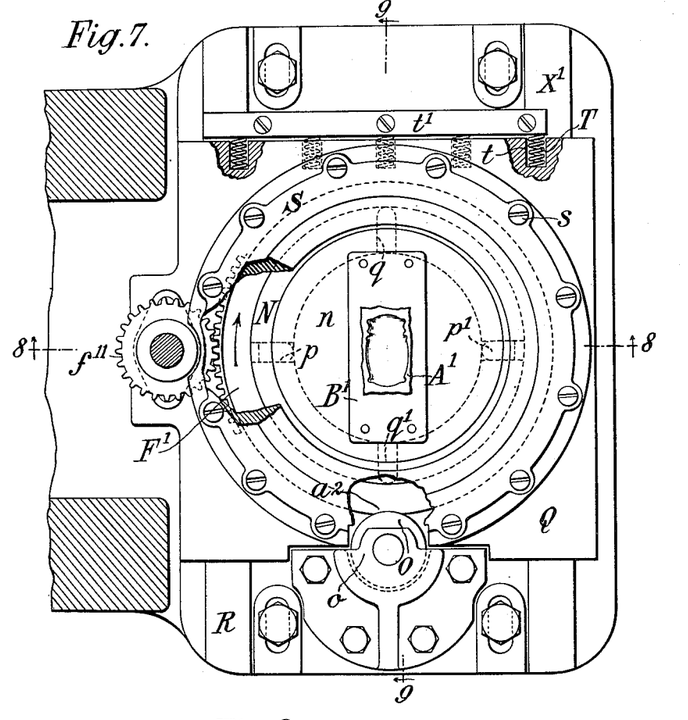
Fig. 7 is a plan view partly broken of the lower die and its connected parts illustrating another form of apparatus.
Figure 8:
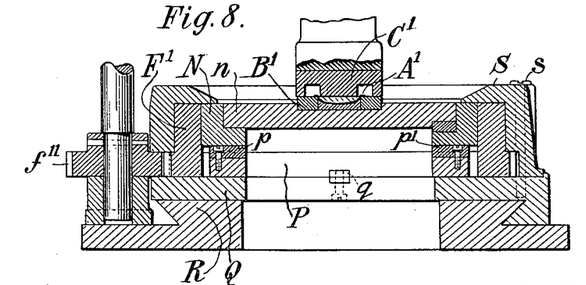
Fig. 8 is a cross-section on the line 8—8, Fig. 7, looking in the direction of the arrows.
Figure 10:
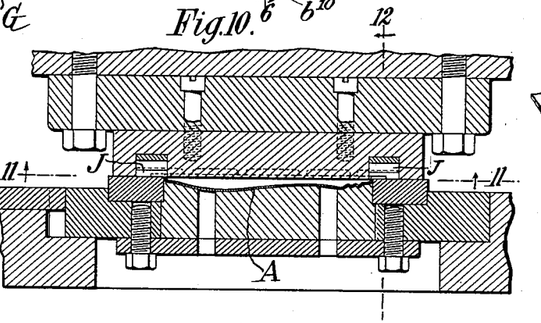
Fig. 10 is a view similar to Fig. 5 of the dies employed in the form of apparatus illustrated in Figs. 7, 8 and 9 illustrating the stamping of Figs. 13 and 14.
Figure 11:
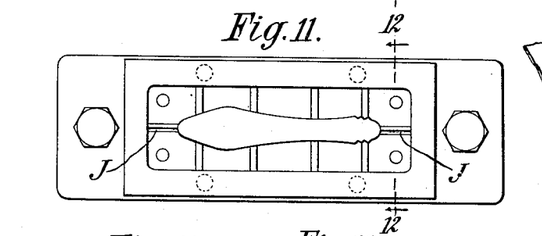
Fig. 11 is a bottom view of the top or cutting die of Fig. 10, on line 11—11 of said figure.
Figure 12:
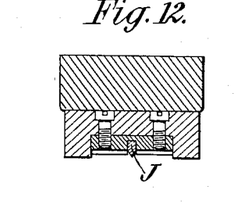
Fig. 12 is a cross-sectional view on the line 12—12 of Figs. 10 and 11 illustrating a slitter for severing the flash.
Figure 13:
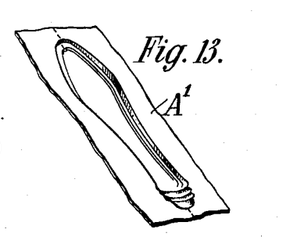
Figs. 13 and 14 are detail views of a stamping both before and after the flash is slitted.
Figures 14, 15:
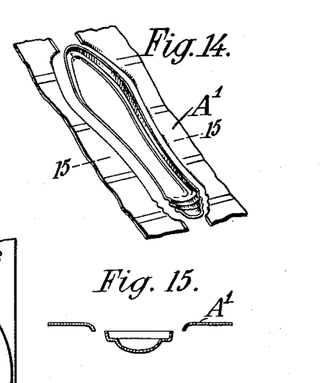
Fig. 15 is a cross-section on the line 15—15 of Fig. 14.

In cases where the flash extends entirely around the stamping, as is the case in the knife handle illustrated in Figs. 13 and 14 or the match-box of Figs. 7 and 8, I may provide a slitter J for dividing the said scrap so as to allow its easy removal, and the said slitter is illustrated in Figs. 10, 11 and 12, where it is mounted in the upper die. Two such slitters are illustrated, and they are mounted so that their function is performed when the dies are brought together.

Figure 18:
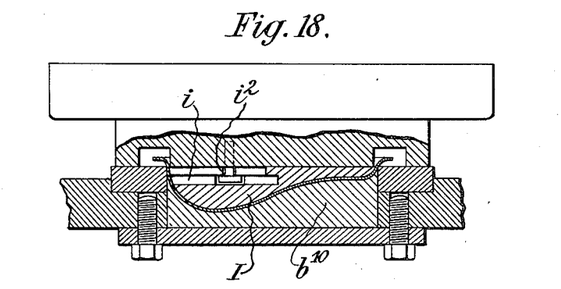
Fig. 18 is a view similar to Fig. 10 illustrating a construction wherein the stamping is not set so deep in the holding die, the slitters being omitted.

In Fig. 18 I have illustrated a construction showing the employment of my invention in trimming the flash or scrap from stampings which are located at different heights in the holding die, which height may be varied as desired to permit the flash to be trimmed to the desired depth. The supporting pad $b^{10}$ is specially made for each job, and if it is desired to trim the flash deeper this pad will be constructed to support the stamping at a slightly higher point in the holding die so that the cutting die will cut off more of the flash. By the employment of supporting pads $b^{10}$ of desired heights the stamping may be supported so that the point at which it is desired to produce the trimmed surface may be brought in the plane of the cutting edge, whether such point be coincident with the forming die surface or below the same.

In Fig. 18 the stamping is supported on a pad $b^{10}$ which is of a suitable height to allow the stamping to be trimmed below the forming die line an amount sufficient to remove the fillet in the corner of the flash. In combination with the supporting pad I use a floating filler piece which is of a height to bring its top in the same plane as the surface of the holding die. By this means when the dies are brought into cutting relation the blank is held firmly to prevent rocking or rolling during the cutting action.

Figure 1:
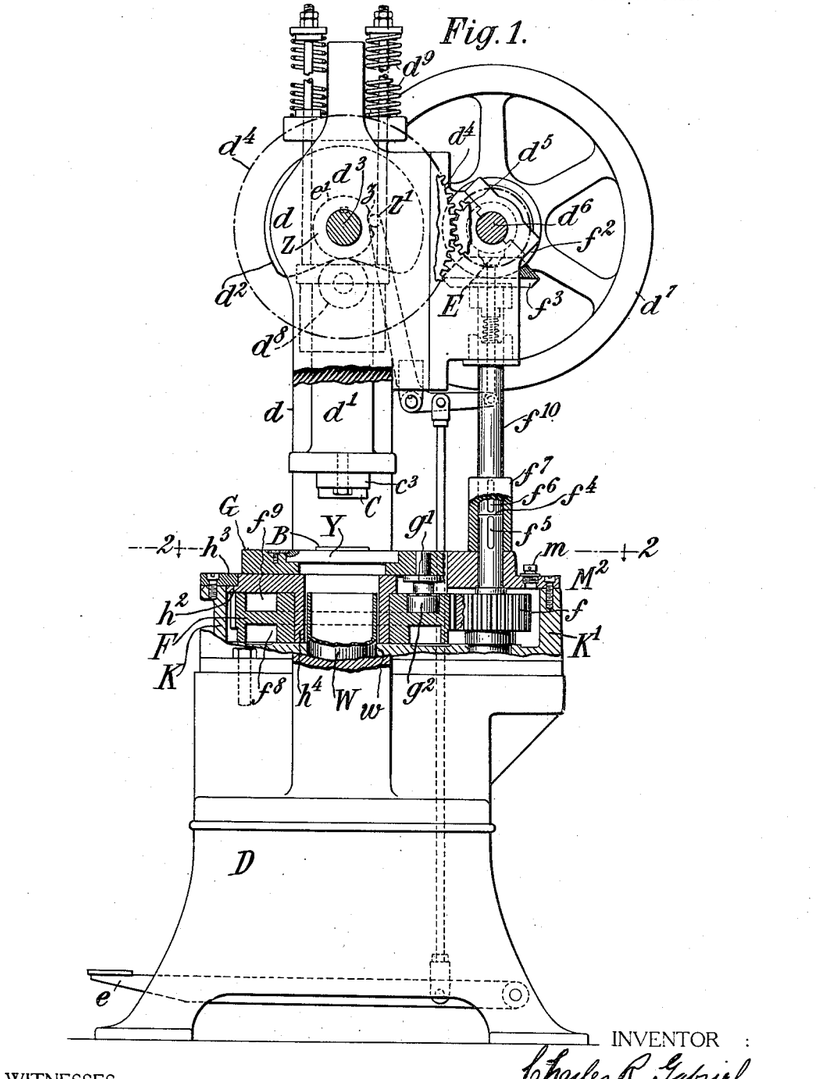
Figure 1 is an elevation partly in section of a machine which may be used in the practice of my invention, the part in section being taken on the line 1—1 in Fig. 2.
Figure 2:
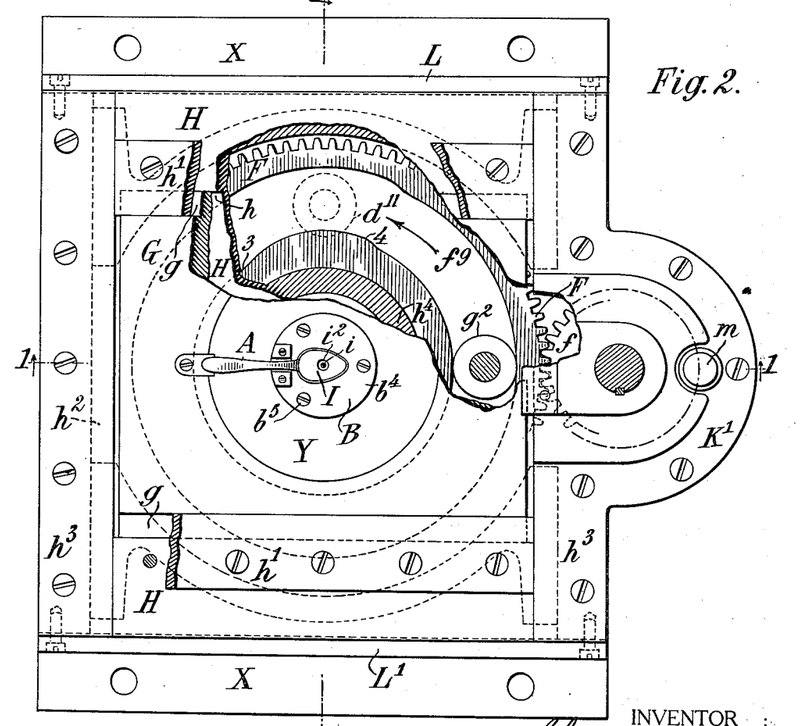
Fig. 2 is a cross-section partly broken on the line 2—2 in Fig. 1.

I have illustrated in Fig. 1 a press which may conveniently be employed in carrying out my method. The press here shown has a base D and an upper frame $d$ within which is mounted a ram $d^1$ which carries the cutting die. The cutting die is illustrated as reciprocated by a cam $d^2$ on a cam shaft $d^3$ which is turned through gears $d^4$, $d^5$ from a main shaft $d^6$ driven by flywheel $d^7$. The cam $d^2$ reciprocates the ram through roller $d^8$ which is fixed to the ram; springs $d^9$ hold the roller $d^8$ against the cam $d^2$.

The machine is provided with a clutch E for starting the machine from the continuously rotating flywheel $d^7$, and which need not be further illustrated or described as it forms no part of this invention. It is the well-known Stiles clutch, and by means of the treadle this clutch is engaged, and the shaft $d^6$ is allowed to rotate three revolutions to complete one cycle of the machine. The disengagement of the clutch is accomplished by means of the clutch operating cam $e^1$ on cam shaft $d^3$.

The particular construction of press illustrated, and clutch and means for reciprocating the cutting die, are not parts of my present invention, which is concerned wholly with the method for trimming the flat surface.

Figure 3:
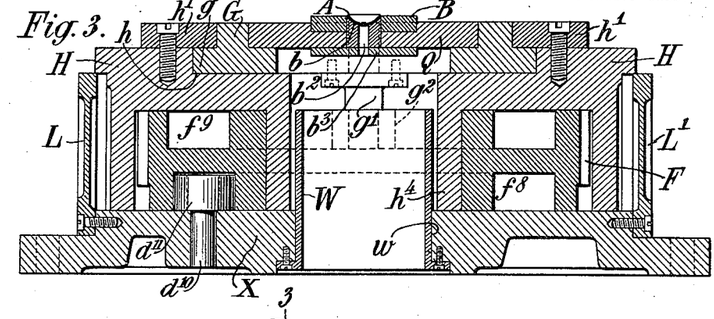
Fig. 3 is a vertical section of the lower slides and their connected parts on the line 3—3 in Fig. 2 looking in the direction of the arrows.

In the use of my method the desired relative movement of the holding and cutting dies may be attained by imparting actual movement to one or the other member. In the apparatus illustrated in Fig. 1, the desired movement is obtained by moving the lower or holding die B. The holding die is given four movements which are in two perpendicular lines, and which movements may be accomplished in many ways. As illustrated in the preferred form of machine, the said movements are produced through two slides, the upper one of which, G, supports the holding die, and has a slight longitudinal movement in ways $h$ provided in a lower support or slide H (Fig. 3). Gibs $h^1$ are provided which overhang flanges $g$ on the top slide and hold the same in position. These gibs are held in the lower slide by suitable means, as by the threaded screws illustrated. The upper slide in the preferred form of machine illustrated has its movement along a line extending from front to rear of the machine, and the lower slide has its movement along a line extending from side to side of the machine. The lower slide as illustrated in Fig. 1 is provided with flanges $h^2$ which pass under gibs $h^3$ threaded into a fixed part of the machine, which together produce a track or ways for the longitudinal movement of the said lower slide. The respective movements of the said slides are accomplished through a cam wheel F which is externally geared and is turned from a pinion $f$. The cam wheel F is provided with two cam grooves $f^8$, $f^9$. The upper cam groove $f^9$ is seen in full lines in Fig. 4 and the lower cam groove $f^8$ is seen in dotted lines in said figure. The upper cam groove $f^9$ provides for the movement longitudinally of the upper slide, and this is accomplished by means of a projection or lug $g^1$ which is fixed at its upper end in the said slide and at its lower end carries a roller $g^2$ which fits within the upper cam slot $f^9$ and is moved, and correspondingly moves the slide in one direction as the fall 3 of the cam-groove encounters the roller $g^2$, and in the other direction as the rise 4 in the cam-groove encounters the said roller.

A movement in a direction perpendicular to that imparted by the longitudinal movement of the upper slide is given to the holding die by the longitudinal movement of the lower slide which carries with it the upper slide. This movement is derived from the fact that the cam-wheel F is journaled upon a tubular sleeve $h^4$ of the lower slide, and is adapted to move the same as the said cam-wheel F is moved. The cam-wheel F is capable of a slight but sufficient movement without hindrance from the pinion $f$. This movement is given to it by the projection $d^{10}$ (Fig. 3) which is suitably secured in the fixed part X of the base D and projects upward within the cam-groove $f^8$ where it carries the snugly fitting roller $d^{11}$. This roller encounters the successive fall 1 and rise 2 of the lower cam-groove $f^8$, and by reason of the fact that it is fixed, causes the cam-wheel F and also the lower slide to be moved in a direction perpendicular to that imparted to the upper slide by the upper cam-groove. The projection $g^1$ for the longitudinal movement of the upper slide, as illustrated, is disposed in quadrature to the projection $d^{10}$ for moving the said slide in a direction perpendicular to said movement.

Either the upper or the lower slide may be made to move first as best suits the outline of the surface to be trimmed. This is accomplished by varying the starting position of the geared cam wheel. In the case of the stamping A it is preferred to cut the flash from the sides of the stamping first and therefore the geared cam wheel is so arranged that the lower slide will be the first moved. The starting position, in which the ram is elevated, is illustrated in Fig. 1.

A rotary movement is imparted to the gear wheel F by the pinion $f$ which is carried at the lower end of a shaft $f^{10}$. This shaft is divided at $f^4$ and its respective portions carry keys $f^5$, $f^6$ which are received in the coupling sleeve $f^7$ by which the said portions are united. The shaft is driven from the main driving shaft $d^6$ by miter gears $f^2$, $f^3$ mounted on the respective shafts $d^6$, $f^{10}$.

It is desired that the cam wheel F should run in oil, and for this purpose an oil well is provided by the sides K, $K^1$ which are cast as part of the base D, and at the front and rear of the machine respectively, and by side pieces L, $L^1$ (Fig. 3) which are held in place by bolts threaded into a fixed part of the machine; and by a tubular dam W which fits closely to the opening $w$ of the plate X (part of base D) which carries the side pieces K, $K^1$, L, $L^1$, and in which the post $d^{10}$ is fixed. The dam is illustrated as held in place by screws threaded into the said plate X and extends upwardly far enough to insure the proper height of oil in the oil well. The said oil well is filled through an opening in the frame which is closed by the plug $m$ (Fig. 1).

The direction of the relative movements between the two dies, with relation to the stamping or drawn work, will depend somewhat upon the outline of the work. In case the particular mechanism of my preferred form is employed, for instance, to trim the stamping having the substantially rectangular outline of surface of Fig. 7, the successive movements should be directed toward the four corners of the stamping, whereby the entire surface will be trimmed.

Figure 4:
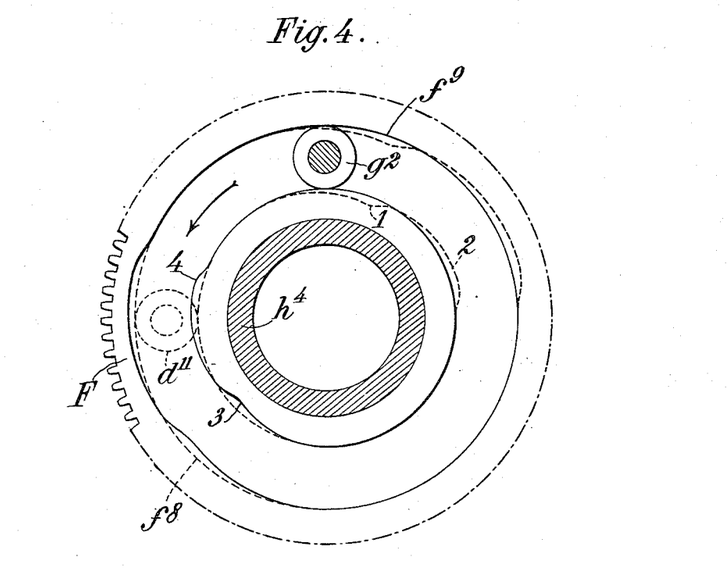
Fig. 4 is a detail top view of a slide-controlling eccentrically-grooved cam-wheel.

The operation of my invention and of the preferred form of machine in connection with which the same is illustrated, is as follows: The spoon-stamping A is inserted in the lower die B at a time when the upper die C is elevated through the action of the springs $d^9$, at the time the cam roller $d^8$ enters the fall in the cam $d^2$. At this time the operator depresses the treadle $e$ tripping the clutch E, whereupon the cam $d^2$ turns. When the cam roller $d^8$ emerges from the fall in the cam the cutting die is forced down and the filler I is carried down with it and enters the stamping A. At this time the lower face of the cutting die C is level with the upper face of the filler I and with the upper face of the holding die B. The rotation of the cam-wheel F in the direction of the arrow, Fig. 4, or counter-clockwise, will cause the following motions to be imparted to the lower or holding die. The starting position in which the ram $d^1$ is elevated is illustrated in Fig. 4. By the time the ram has descended, the cam-wheel F will have turned sufficiently so that the fall 1 in the lower cam-groove $f^8$ will encounter roller $d^{11}$ carried by post $d^{10}$ which is fixed in place in the machine. The stationary position of the said roller will cause the said cam fall 1 to move the cam-wheel F, and with it the lower slide H. This will impart to the upper slide G a movement from side to side of the machine, or perpendicular to the separate movement of said upper slide. Therefore it will be seen that the fall 1 on the cam-groove will force the combined structure consisting of the cam-wheel F, lower slide H, upper slide G and holding die B with the stamping A toward the left of the machine, thereby causing the stationary cutting die C to trim the right hand flat surface of the stamping A, looking toward the rear of the machine. The succeeding rise 2 in the cam-groove $f^8$ will cause a motion of the holding die in the opposite direction whereby the opposite side of the surface is trimmed.

Continued rotation of the geared cam-wheel F will cause the fall 3 in the upper groove $f^9$ to encounter the roller $g^2$ which is attached to the post $g^1$ fixed in the upper holding die slide G. The said cam-wheel F being fixed in position with relation to the movement of the said upper slide G by contact of the lower slide H with sides K, $K^1$ and gibs $h^3$, the cam surface 3 will cause the said upper slide to move forward or toward the front of the machine, as indicated in Fig. 5, thereby trimming the surface at the point of the spoon A (Fig. 5).

The rise 4 in the cam-groove $f^9$ will cause the die B to execute a movement in the same line but in the opposite direction from the first movement and toward the rear of the machine, thereby in coöperation with die C trimming the flash from the heel of the stamping A, and by reason of the recess $c^7$ in the cutting die C this trimming is done without injury to the spoon handle.

The stamping having now been completely trimmed, the cutting die C will be reëlevated by the fall in the cam $d^2$ receiving the roller $d^8$, whereupon the springs $d^9$ will lift the ram $d^1$ and connected cutting die C, and the stamping and flash or scrap may then be removed. The driving shaft $d^6$ revolves three times to one revolution of the cam shaft $d^3$. At the end of one revolution the clutch cam Z on the cam shaft will allow the clutch lever $Z^1$ to drop into the fall $z$ as shown in Fig. 1, whereupon the machine will stop.

Figure 9:
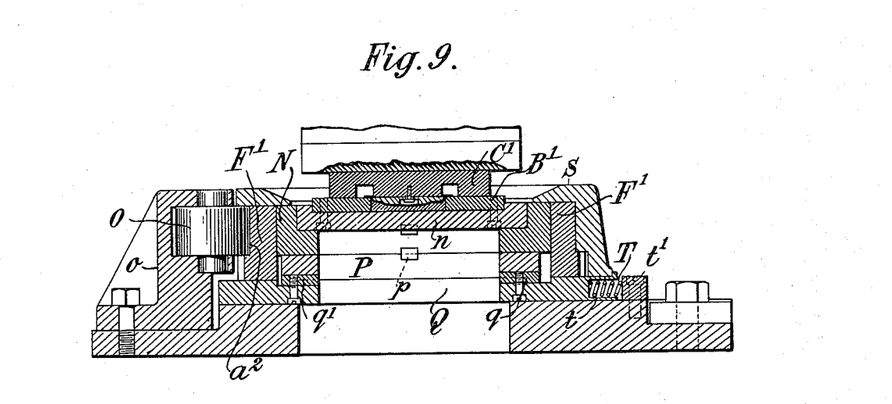
Fig. 9 is a similar section on the line 9—9, Fig. 7, looking in the direction of the arrows.

To show the different ways in which the desired relative movement between the respective dies may be accomplished, I have illustrated in Figs. 7, 8 and 9, another form of machine wherein the relative movement described by the cutting die with relation to the holding die is a rotary, oval, oblong or elliptical movement. In this modification the stamping $A^1$ represents one half of an article, which is joined to another corresponding half at its longitudinal edges or flat surface, and it will be apparent that the advantage gained in the production of an article of this kind by means of my invention is considerable, for the article is produced with a flat surface on its edges without fins, slivers, or burs, so that the two halves can be immediately joined and soldered together, and the requisite amount of surface is provided in order that a full cross-section of the material is available for this purpose. Any slight roughness produced by the trimming process will be on the outer edge, where it will be removed by the necessary steps incident to removing the solder. The said stamping is held in the holding die $B^1$, and the cutting die $C^1$ is reciprocated in the same manner as the cutting die C of the preferred form, and is similarly provided with the filler and the supporting pad in the holding die.

As here illustrated the cutting die $C^1$ is stationary and is located with its cutting edges within the outline of the surface to be trimmed of the stamping $A^1$. As seen in Fig. 9, the said cutting die requires a very slight movement to bring it into contact with the surface to be trimmed, and this is true not only longitudinally as seen in said figure, but also transversely as seen in Fig. 8. The holding die $B^1$ is fixed to a disk die-block $n$ which is secured within a ring N. This ring fits closely within the cut-out center of a gear-wheel $F^1$ which is rotated. The opening in the gear-wheel $F^1$ which receives the ring N is eccentrically located with reference to the center of rotation of the said gear-wheel, whereby the said ring and the holding die $B^1$ are given the requisite motion to cause the cutting die to trim the surface. As seen in Fig. 7 the eccentricity of the opening in the gear-wheel $F^1$ is slight but is sufficient to impart the desired movement to the holding die.

The parts are illustrated in the position of rest in Fig. 9, wherein a roller O which is mounted in a bracket $o$ adjustably fixed to the frame, passes within a recess $a^2$ of the gear $F^1$. As the gear $F^1$ is turned clockwise (Fig. 7) by pinion $f^{11}$, the recess $a^2$ in the gear $F^1$ moves away from the roll O thereby moving the slide Q and all the parts mounted thereon longitudinally of the stamping or toward the right, as seen in Fig. 9, whereby the parts assume the position shown in Fig. 17 and the cutting die is caused to trim the surface at the left-hand end of the stamping, as seen in said Fig. 17. Thereupon a continued rotation of the gear $F^1$ will cause its eccentric bore to pass around the ring N, moving the holding die with relation to the cutting die and causing the latter to assume a position over the several portions of the surface to be trimmed. As the gear-wheel F¹ makes a complete revolution, the holding die will describe an orbit in the course of which every part of the surface to be trimmed will be subjected to the cutting die. The trimming will start as before stated, upon the first movement of the holding die which is radial with respect to its orbit and is caused by the passage of roller O moving the holding die and its connected parts, when the rotation of the gear-wheel causes the recess therein to pass out of engagement with the roller. Subsequent movements of the holding die are derived solely from the movement of the ring N within the eccentric bore of the gear-wheel F¹.

A detailed description of the mechanism of the type of machine of Figs. 7, 8, 9 and 17 is as follows: The ring N which moves the holding die is keyed to an annulus P by keys $p$ $p^1$ which are situated opposite from each other as seen in Fig. 8, and which hold the ring N from rotation but permit it to move longitudinally of the said keys. The annulus P is secured to a slide Q by keys $q$ $q'$ (Fig. 9) and these keys permit the annulus P to move transversely with relation to slide Q, so that by these means the holding die B¹ may move in its orbit, but without rotation. The slide Q is mounted on ways R fixed to the base of the machine, which enables the said slide to move with the eccentric gear-wheel F¹ and its connected parts when the first movement is imparted thereto by its cam-surface $a^2$ acting against the roll O. Gib ring S is bolted to the slide Q by bolts $s$.

The cam surface $a^2$ of the gear F¹ is held in contact with the roll O by means of springs T, of which a suitable number are employed, and five are illustrated in Fig. 7, which press the said cam-surface directly against the said roll. These springs are mounted in holes $t$ in one end of the slide Q and engage against a stop bar $t^1$ suitably attached to the base X¹.

Figure 17:
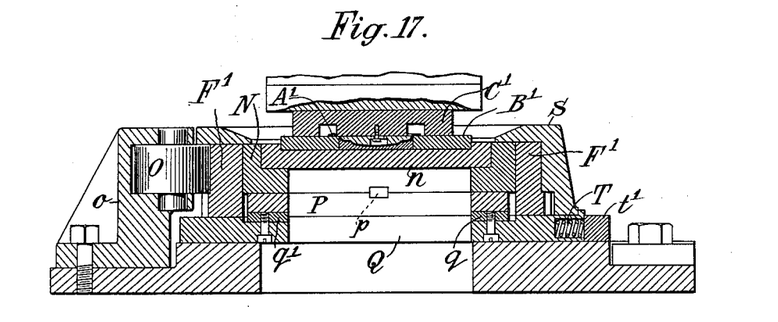
Fig. 17 is a view similar to Fig. 9 illustrating the parts just after starting, where the cutting die has just made its first cut due to the longitudinal movement of the holding die slide caused by the roll O, acting on the exterior cam surface of gear $F^1$ after the recess $a^2$ has passed beyond the roll.

The machine, essentially as to its driving mechanism, is similar to that illustrated in Fig. 1, and differs therefrom in respect to the construction of devices for trimming the flat surfaces of stampings and drawn shells in the particulars noted. In the operation of this form of machine, the blank of Fig. 7 or Fig. 13 will be applied in the holding die as illustrated in Fig. 10, whereupon the cutting die will descend and the slitters J will sever the flash, as illustrated in Fig. 14. Thereupon motion being imparted to the gear-wheel F¹ by the pinion $f^{11}$ it will turn clockwise in Fig. 7, until the recess $a^2$ shall have passed out of contact with the roll O. This will cause the said gear wheel to execute a movement longitudinally of the ways R with the slide Q and connected parts, and this motion is allowed without causing it to pass out of gear with the pinion $f^{11}$. The said movement will cause the holding die to pass to the right as shown in Fig. 17, whereby the cutting die will have trimmed the surface at the left of the said figure and nearest the roll O in Fig. 7. At this time, as illustrated in Fig. 7, the rise of the eccentric surface on the gear-wheel F¹ will be on the same side as the notch $a^2$. As the said gear-wheel is turned the eccentricity of its interior will cause the holding die B¹ to move relatively to the cutting die, whereby the different parts of the surface to be trimmed are respectively brought under the cutting die and trimmed. When the rotation of the disk F¹ is completed, the scrap or flash will be entirely severed and the recess $a^2$ will again have passed into contact with the roller O, causing the cutting die to assume its central position with reference to the holding die. The cutting die will then be lifted by the operation of the machine, whereupon the stamping and flash may be removed.

It will be seen that by means of my method with either form of apparatus illustrated, I accomplish the object of producing a flat trimmed surface in stampings, wherein the entire finished trimmed surface is in the same plane, so that if the stampings require to be soldered together as is the case of the two halves of the knife handle or the match box illustrated, this operation may immediately be performed.

My invention is available to trim the scrap from the edges of stampings, or of drawn shells, and is not limited in its employment to the way in which the article to be trimmed is produced. Nor is it limited to the shape of the outline of the edge to be trimmed as it is equally available for trimming a surface wherein the outline is substantially rectangular as wherein it is oval, or oblong or irregularly shaped, and this is due to the fact that by my invention every part of the surface to be trimmed is subjected to outwardly directed cuts which are produced by relative movement between a female or holding die and a cutter, irrespective of the manner in which the movement is imparted or which is the movable member.

The extent of relative motion required by the dies is dependent upon the distance between the cutting die and the surface to be trimmed, in other words, the looseness with which this die fits within the outline of the surface to be trimmed. In the case of the construction of Figs. 7 to 9 the initial movement radial to its orbit of the holding die is ¼ inch and the diameter of its orbit is ¼ inch.

By the expression "within the outline of the surface to be trimmed" as used in this specification and claims, I mean within the outline of the surface which will be produced upon the edge of the stamping after the scrap or flash is severed.

In this position before its operation begins and after it is concluded, in those applications of my invention wherein a cutting die is the member employed to cut the flash, said die is situated so that its edge nowhere extends outside of the line of attachment of the scrap or flash to the stamping, so that it may be inserted in the work without touching the said scrap.

I have illustrated my invention as adapted to light work of the kind which is performed by silversmiths and manufacturers of light hollow ware, but its utility is not limited to such uses, and the principle of the invention as described and as claimed may be used in work of different kinds, even attending to the trimming of the very heaviest stampings or drawn shells, such as are found in automobile bodies and transmission and engine cases, and the invention will, as I believe, be found practically available in trimming the edges of large stampings of all kinds that are intended to be joined, as by welding, at such edges.

An advantage of my method of trimming the flash or scrap from stamped or drawn work is in the fact that such drawn or stamped work may be easier produced. It has heretofore been found necessary that the forming die should have its edges as sharp as they could practicably be made and not fracture the material. Obviously by the use of my invention in trimming such edges it will no longer be necessary that the edges should have a sharp corner, as the trimming is accomplished as easily if there is a good-sized fillet present, as though the corner were sharp. The production of such drawn or stamped work is largely facilitated if a round-cornered die may be used, as the metal will more readily flow into the die. Therefore it will be seen that my invention enables the shell or stamping to be produced more easily than would be the case if the edge were to be trimmed by any other method. The present application for patent claims only the method herein described. The apparatus illustrated and described forms the subject-matter of a separate application for Patent, Serial No. 834,105, (patented July 31, 1917, No. 1,235,197,), of which this present application is a division.

Although I have with particularity described certain forms of mechanism available for use in the employment of my method, it is obvious that the use of said method does not require such mechanism. It is further to be borne in mind that in describing the mechanism I have described the same as I prefer to use it, and that many changes may be made therein and equivalent devices substituted, and that modifications may be made in the method described within the limits of the appended claims.

I claim as my invention:—

1. The described method of trimming the flash or scrap from stampings, which consists in holding the stamping by pressure in direction perpendicular to the plane of the cut to be made, and then shearing the flash by outwardly directed cuts in a plane parallel with and closely adjacent the plane of said flash.

2. The described method of trimming the flash or scrap from stampings, which consists in holding the stamping firmly clamped and within a cutting edge encircling the stamping, and then shearing the flash by outwardly directed cuts against such edge in a plane parallel with and closely adjacent the plane of said flash.

3. The described method of trimming the flash or scrap from stampings, which consists in holding the stamping firmly clamped and within a cutting edge encircling the stamping, and then shearing the flash by placing wholly within the outline of the cut to be made a cutting tool having a cutting edge approximately conforming to, but within the outline of, such cut, and moving such tool relatively to said encircling cutting edge in such directions as to cause it to make outward cuts against such edge and including all of said outline, said cuts being in a plane parallel with and closely adjacent the plane of said flash.

4. The described method of trimming flash or scrap from stampings, which consists in holding the stamping by clamping it between dies within a cutting edge encircling the stamping, such cutting edge and the upper face of the upper clamping die being in the plane of the cut to be made and parallel with and closely adjacent the plane of said flash, and then shearing the flash by outwardly directed cuts in said plane against said encircling cutting edge.

In witness whereof, I have hereunto signed my name in the presence of two subscribing witnesses.

CHARLES R. GABRIEL.

Witnesses:
HENRY M. TURK,
THOMAS I. WALLACE.